(12) United States Patent
Zhao et al.

(10) Patent No.: US 9,219,589 B2
(45) Date of Patent: Dec. 22, 2015

(54) UPLINK TRANSMISSION METHOD AND APPARATUS IN CARRIER AGGREGATION SYSTEM

(75) Inventors: Yali Zhao, Beijing (CN); Fangli Xu, Beijing (CN); Li Chen, Beijing (CN); Jiamin Liu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 165 days.

(21) Appl. No.: 14/008,969

(22) PCT Filed: Mar. 16, 2012

(86) PCT No.: PCT/CN2012/072459
§ 371 (c)(1),
(2), (4) Date: Sep. 30, 2013

(87) PCT Pub. No.: WO2012/130055
PCT Pub. Date: Oct. 4, 2012

(65) Prior Publication Data
US 2014/0233535 A1 Aug. 21, 2014

(30) Foreign Application Priority Data
Mar. 31, 2011 (CN) .......................... 2011 1 0080379

(51) Int. Cl.
*H04J 3/00* (2006.01)
*H04L 5/00* (2006.01)
(Continued)

(52) U.S. Cl.
CPC .............. *H04L 5/0053* (2013.01); *H04L 5/001* (2013.01); *H04L 27/2656* (2013.01); *H04W 56/00* (2013.01); *H04W 56/0045* (2013.01); *H04W 72/0453* (2013.01)

(58) Field of Classification Search
USPC ........... 370/252–328, 336–350; 455/517–522
See application file for complete search history.

(56) References Cited

FOREIGN PATENT DOCUMENTS

| CN | 1956358 A | 5/2007 |
|---|---|---|
| CN | 101489305 A | 7/2009 |

(Continued)

OTHER PUBLICATIONS

Supplementary European Search Report issued for the EP counterpart application 12762885.7.
(Continued)

*Primary Examiner* — Man Phan
(74) *Attorney, Agent, or Firm* — Kilpatrick Townsend & Stockton LLP

(57) ABSTRACT

The invention discloses an uplink transmission method and apparatus in a carrier aggregation system and relates to the field of radio communications so as to address the issue of how to perform uplink transmission in a secondary cell when a base station configures a user equipment additionally with the secondary cell. In the invention, a user equipment selects, under a preset reference carrier selection rule, one of downlink carriers corresponding to cells having already established downlink synchronization with a base station as a timing reference downlink carrier used by a secondary cell after the base station configures the user equipment additionally with the secondary cell; and the user equipment performs uplink transmission in the secondary cell according to downlink timing of the timing reference downlink carrier. With the invention, a timing reference downlink carrier used by an additionally configured secondary cell in uplink transmission can be determined and uplink transmission can be further preformed over the timing reference downlink carrier.

12 Claims, 6 Drawing Sheets

(51) Int. Cl.
*H04W 72/04* (2009.01)
*H04W 56/00* (2009.01)
*H04L 27/26* (2006.01)

(56) References Cited

FOREIGN PATENT DOCUMENTS

| CN | 101646234 A | 2/2010 |
| CN | 102118801 A | 7/2011 |
| KR | 20110018790 A | 2/2011 |

OTHER PUBLICATIONS

Ntt Do Como et al : "Reference DL CC for TA", 3GPP Draft; R2-103221, 3rd Generation Partnership Project (3GPP), Mobile Competence Centre ; 650, Route Des Lucioles ; F-06921 Sophia-Antipolis Cedex ; France, vol. RAN WG2t No. Montreal, Canada; 20100510, May 4, 2010, XP050423303, [retrieved on May 4, 2010] * p. 2, paragraph 2-p. 3* * figure 1 *.

--Prior art--

--Prior art--

--Prior art--

UPLINK TRANSMISSION METHOD AND APPARATUS IN CARRIER AGGREGATION SYSTEM

This application is a US National Stage of International Application No. PCT/CN2012/072459, filed 16 Mar. 2012, designating the United States, and claiming the benefit of Chinese Patent Application No. 201110080379.3, filed with the Chinese Patent Office on Mar. 31, 2011 and entitled "Uplink transmission method and apparatus in carrier aggregation system", which is hereby incorporated by reference in its entirety.

FIELD OF THE INVENTION

The present invention relates to the field of radio communications and particularly to an uplink transmission method and apparatus in carrier aggregation system.

BACKGROUND OF THE INVENTION

Significantly improved peak rates up to 1 Gbps in the downlink and 500 Mbps in the uplink are required for a Long Term Evolution-Advanced (LTE-A) system as compared to a Long Term Evolution (LTE) system. Also good compatibility of the LTE-A system with the LTE system is required. Carrier Aggregation (CA) is introduced into the LTE-A system so as to accommodate the required improved peak rates, compatibility with the LTE system and full use of spectrum resources.

Carrier aggregation refers to a mechanism in which a User Equipment (UE) can aggregate a plurality of cells concurrently and the plurality of cells can provide the UE concurrently with a data transmission service. In the system with carrier aggregation, carriers corresponding to the respective cells may be consecutive or inconsecutive in the frequency domain, the maximum bandwidth of each component carrier is 20 MHz for compatibility with the LTE system, and there is a bandwidth which may be the same or different across the respective component carriers.

With carrier aggregation, operating cells of a user equipment are categorized into a primary cell (PCell) and several secondary cells (SCells), where the primary cell is responsible for transmission of the majority of control signaling, for example, sending uplink feedback information to downlink data, reporting a Channel Quality Indicator (CQI), transmitting an uplink pilot, etc., and the secondary cell is primarily a resource and responsible for transmitting data.

Random accesses in the LTE system are categorized into a contention-free random access and a contention based random access.

FIG. 1 illustrates a contention-free random access procedure which generally includes the following three steps:

Message 0 (Msg0): Abuse station assigns a UE with a dedicated Random Access Preamble Index (ra-PreambleIndex) for a contention-free random access and the mask index of a Physical Random Access Channel (PRACH) (ra-PRACH-MaskIndex) for the random access; and for a contention-free random access due to downlink data arrival, such information is carried over a Physical Downlink Control Channel (PDCCH), and for a contention-free random access due to a handover, such information is carried in Radio Resource Control (RRC) signaling.

Message 1 (Msg1): The UE sends the specified dedicated preamble to the base station over the specified PRACH resource according to the ra-PreambleIndex and the ra-PRACH-MaskIndex indicated by the Msg0. The base station calculates an uplink Timing Advance (TA) according to the Msg1 upon reception of the Msg1.

Message 2 (Msg2): The base station sends to the UE a random access response including information on the TA and a UL grant (uplink scheduling signaling) to allocate a resource for subsequent uplink transmission, where the TA is used by the UE to subsequently determine a timing relationship of uplink transmission. The PDCCH carrying the Msg2 is scrambled with a Random Access Channel Radio Network Temporary Identify (RA-RNTI) uniquely corresponding to a time-frequency resource over which the Msg1 is sent in a 10 ms window; and moreover the Msg2 further carries a preamble ID, and the UE determines from the RA-RNTI and the preamble ID that the Msg2 is a message corresponding to the Msg1 sent from the UE.

FIG. 2 illustrates a contention based random access procedure which generally includes the following four steps:

Message 1 (Msg1): A UE selects a random access preamble and a PRACH resource and sends the selected random access preamble to a base station over the PRACH resource;

Message 2 (Msg2): The base station receives the preamble, calculates a TA and sends to the UE a random access response including at least information on the TA e and a grant for a message 3 (Msg3);

Message 3 (Msg3): The UE sends uplink transmission over a resource specified by the UL grant in the Msg2, and contents of the uplink transmission of the Msg3 vary from one random access reason to another, for example, an RRC Connection Establishment Request is sent in the Msg3 for an initial access; and Message 4 (Msg4): The base station sends a Contention Resolution message to the UE, and the UE can judge from the Msg4 whether the random access succeeds.

For both a contention based random access or a contention-free random access, the Msg1 has to be sent at such an instant that refers to the starting point of a downlink radio frame of a cell, and as illustrated in FIG. 3, the user equipment determines the starting point of a downlink radio frame i of a cell and adjusts somewhat the instant at which the Msg1 is sent by the timing advance with reference to the starting point, where the timing advance adjustment amount of the Msg1 is $(N_{TA} + N_{TA\ offset}) \times T_s$, where $N_{TA}$ is the timing advance adjustment amount used in last timing adjustment, and $N_{TA}$ takes the value of 0 for the Msg1 of a random access; and $N_{TA\ offset}$ is an offset related to a duplex mechanism, with $N_{TA\ offset} = 0$ for Frequency Division Duplex (FDD) and $N_{TA\ offset} = 624$ for Time Division Duplex (TDD). For the Release 10 (R10), multi-TA is not supported, so a random access will be initiated only in a PCell, and the user equipment obtains an uplink timing advance with reference to timing of a downlink carrier of the PCell.

Due to the introduction of carrier aggregation, if cells operating over different carriers have significantly different frequency characteristics and distances between transmitters and receivers, then there may be different uplink timing advances for the different carriers.

Two scenarios in support of multi-TA are currently defined in the $3^{rd}$ Generation Partnership Project (3GPP).

The first scenario is a scenario in which a Remote Radio Head (RRH) is introduced as illustrated in FIG. 4.

For example, a large coverage area is provided at F1, an RRH is used at F2 for hotspot coverage in an F1 cell, and mobility management is performed based upon F1. In this scenario, if a UE is located in an area where an RRH cell of F2 and the F1 cell overlap, then the F1 cell and the F2 cell can be aggregated, but there are different uplink TAs (UL TAs) for the F1 cell and the F2 cell.

The second scenario is a scenario in which a repeater is introduced as illustrated in FIG. 5.

For example, a base station supports F1 with a large coverage area and F2 with a small coverage area, and the coverage area of F2 can be extended by a frequency selective repeater. In this scenario, if UE is located in an area where the F1 cell and the F2 cell overlap, then the F1 cell and the F2 cell can be aggregated, but there are different UL TAs for the F1 cell and the F2 cell.

In order to facilitate maintenance of the TAs in the multi-TA system, the concept of TA group is introduced, and the same TA can be used for Uplink Component Carriers (UL CCs) of cells belonging to the same TA group, and there are different TAs for UL CCs of cells belonging to different TA groups. In a TA group, the UE will enable uplink synchronization with all of cells in the TA group simply by maintaining uplink synchronization with one of the cells.

The inventors have identified during making of the invention the following technical problem in the prior art:

In the existing R10 specification, only one TA is supported, and timing of an uplink timing advance refers to a downlink carrier of a PCell. With the introduction of a multi-TA scenario, the timing advance of the PCell may be different from those of other Scells, so it is necessary to consider the issue of how to perform uplink transmission in a SCell when the SCell is newly added.

SUMMARY OF THE INVENTION

Embodiments of the invention provide an uplink transmission method and apparatus in a carrier aggregation system so as to address the issue of how to perform uplink transmission in a secondary cell when a base station configures a user equipment additionally with the secondary cell.

A method of determining a timing reference downlink carrier includes:

a user equipment selecting, under a preset reference carrier selection rule, one of downlink carriers corresponding to cells having already established downlink synchronization with a base station as a timing reference downlink carrier used by a secondary cell, after the base station configures the user equipment additionally with the secondary cell; and the user equipment performing uplink transmission in the secondary cell according to downlink timing of the timing reference downlink carrier.

A user equipment includes:

a reference carrier determination unit configured to select, under a preset reference carrier selection rule, one of downlink carriers corresponding to cells having already established downlink synchronization with a base station as a timing reference downlink carrier used by a secondary cell, after the base station configures the user equipment additionally with the secondary cell; and an uplink transmission unit configured to perform uplink transmission in the secondary cell according to downlink timing of the timing reference downlink carrier.

In the invention, a user equipment selects one of downlink carriers corresponding to cells having already established downlink synchronization with a base station under a preset reference carrier selection rule as a timing reference downlink carrier used by a secondary cell after the base station configures the user equipment additionally with the secondary cell and performs uplink transmission in the secondary cell according to downlink timing of the timing reference downlink carrier. As can be apparent, a timing reference downlink carrier used by a secondary cell in uplink transmission can be determined when a base station configures a user equipment additionally with the secondary cell in a carrier aggregation system, and uplink transmission can be further performed over the timing reference downlink carrier.

DETAILED DESCRIPTION OF THE EMBODIMENTS

In order to address the issue of how to perform uplink transmission in a secondary cell when a base station configures a user equipment additionally with the secondary cell in a carrier aggregation system, an embodiment of the invention provides an uplink transmission method in a carrier aggregation system.

Figure 1:
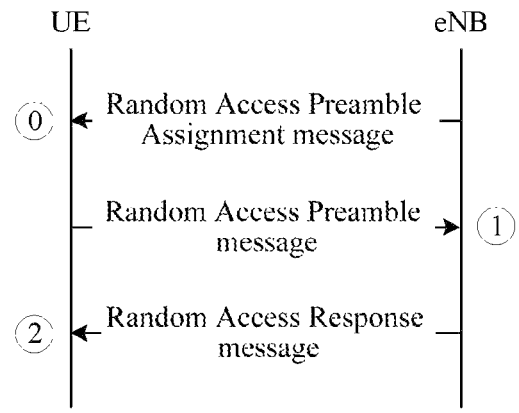
FIG. 1 is a contention-free random access procedure in the prior art.
Figure 2:
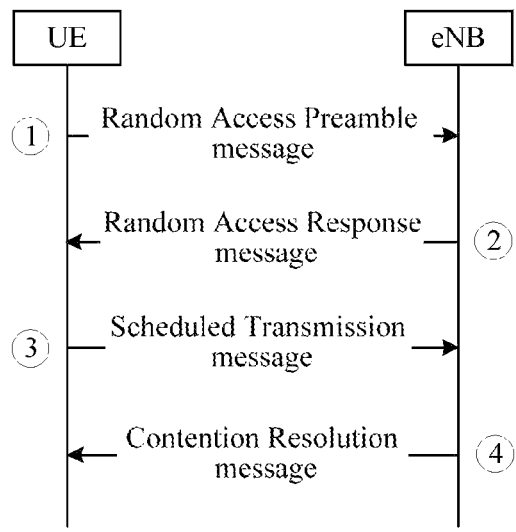
FIG. 2 is a contention based random access procedure in the prior art.
Figure 3:
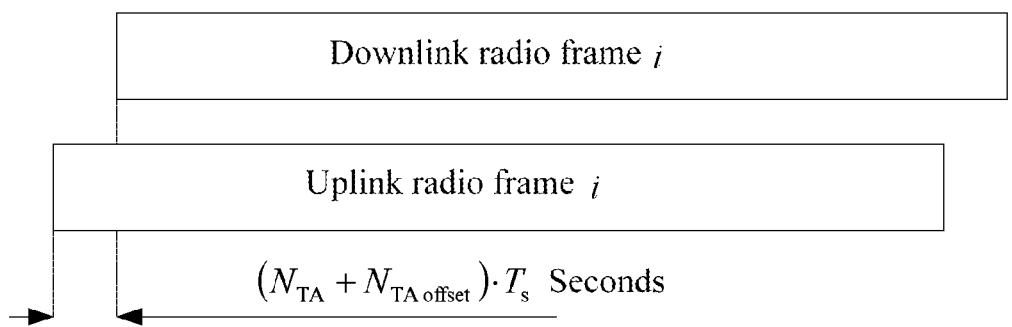
FIG. 3 is a schematic diagram of a timing advance reference of sending the Msg1 in the prior art.
Figure 4:
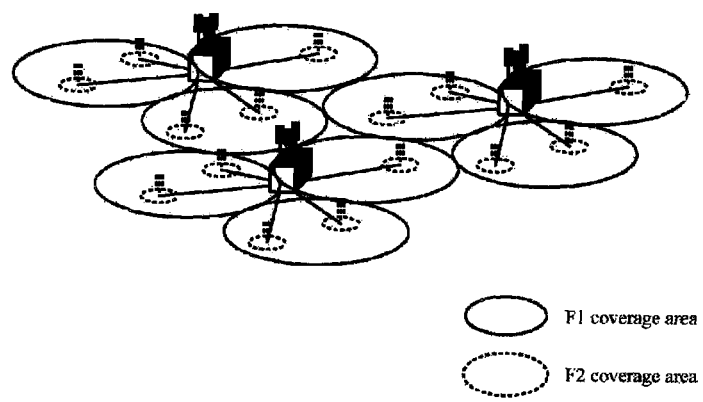
FIG. 4 is a schematic diagram of a multi-TA scenario in which an RRU is introduced in the prior art.
Figure 5:
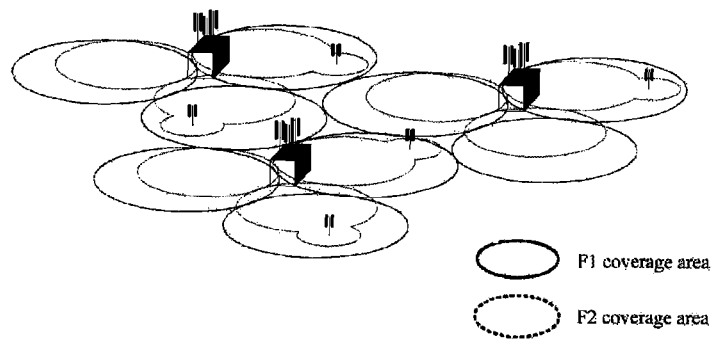
FIG. 5 is a schematic diagram of a multi-TA scenario in which a repeater is introduced in the prior art.
Figure 6:
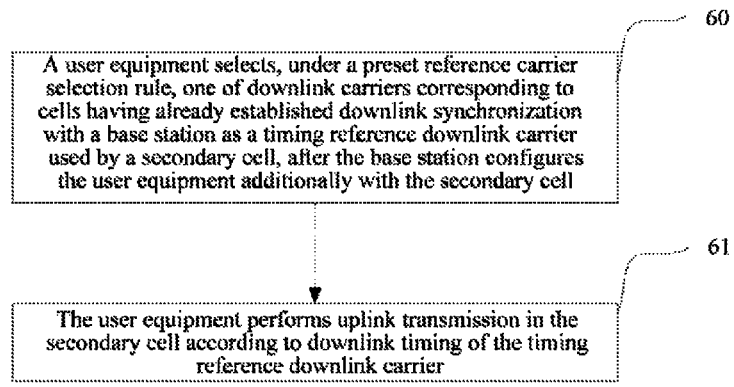
FIG. 6 is a schematic flow diagram method according to an embodiment of the invention.

Referring to FIG. 6, an uplink transmission method in a carrier aggregation system according to an embodiment of the invention includes the following steps:

Step 60: A user equipment selects, under a preset reference carrier selection rule, one of downlink carriers corresponding to cells having already established downlink synchronization with a base station as a tuning reference downlink carrier used by a secondary cell, after the base station configures the user equipment additionally with the secondary cell; wherein the timing reference downlink carrier refers to a downlink carrier used in determining an instant at which data of uplink transmission is sent; and Step 61: The user equipment performs uplink transmission in the secondary cell according to downlink timing of the timing reference downlink carrier.

In the step 60, the user equipment can select, render a preset reference carrier selection rule, one of downlink carriers corresponding to cells having already established downlink synchronization with a base station as a timing reference downlink carrier used by a secondary cell particularly in the following seven approaches:

Firstly the user equipment selects a timing reference downlink carrier used by a cell which is in a TA group to which the secondary cell belongs and has already established uplink synchronization with the base station as a timing reference downlink carrier used by the secondary cell;

Secondly the user equipment selects a downlink carrier corresponding to a primary cell as a timing reference downlink carrier used by the secondary cell;

Thirdly the user equipment selects a downlink component carrier corresponding to a cell the last to initiate a random access successfully in a TA group to which the secondary cell belongs as a timing reference downlink carrier used by the secondary cell;

Fourthly the user equipment selects a downlink component carrier corresponding to an active cell with the lowest number in a TA group to which the secondary cell belongs as a timing reference downlink carrier used by the secondary cell;

Fifthly the user equipment selects a downlink carrier corresponding to the secondary cell as a timing reference downlink carrier used by the secondary cell;

Sixthly the user equipment selects a downlink carrier corresponding to a cell which is beyond a TA group to which the secondary cell belongs and has already established uplink synchronization with the base station as a timing reference downlink carrier used by the secondary cell; for examples, selects a downlink carrier over which the base station sends a PDCCH order to trigger the user equipment to perform a random access as a timing reference downlink carrier used by the secondary cell; and Seventhly the user equipment selects a downlink carrier corresponding to a cell preconfigured by the base station as a timing reference downlink carrier used by the secondary cell. Here the base station can pre-configure in (RRC) signaling a downlink carrier that can be used as a timing reference downlink carrier or a cell corresponding to the downlink carrier.

A particular implementation of the step 61 can be as follows:

Firstly the user equipment determines an uplink TA used for uplink transmission on the secondary cell; and Then the user equipment performs uplink transmission in the secondary cell by the determined uplink TA based upon the downlink timing of the timing reference downlink carrier. Particularly an instant t0 is determined at which downlink data is received in a downlink sub-frame of the timing reference downlink carrier, and the instant t at which the data of uplink transmission is to be sent in the secondary cell is determined in the equation of t=t0−Timing Advance Adjustment Amount, and Timing Advance Adjustment Amount=Uplink TA used in uplink transmission by the user equipment in the secondary cell+Timing Advance Adjustment Amount t1 of last uplink transmission, where T1 is initially $N_{TA\ offset}$, and $N_{TA\ offset}$ is an offset related to a duplex mechanism with $N_{TA\ offset}=0$ for FDD and $N_{TA\ offset}=624$ for TDD; and then the uplink data is sent to the base station at the determined instant t.

An implementation method of the user equipment to determine an uplink TA used for uplink transmission on the secondary cell will be described below in connection with examples:

In a first example, when the timing reference downlink carrier is a timing reference downlink carrier used by a cell which is in the TA group to which the secondary cell belongs and has established uplink synchronization with the base station or a downlink component carrier, selected by the user equipment, corresponding to a cell the last to initiate a random access successfully in the TA group to which the secondary cell belongs, the user equipment can determine an uplink TA used for uplink transmission on the secondary cell as follows:

The user equipment determines an uplink TA used by the cell having already established uplink synchronization with the base station as an uplink TA used for uplink transmission on the secondary cell.

In a second example, when the tuning reference downlink carrier is a downlink carrier corresponding to the primary cell or a downlink carrier corresponding to the secondary cell or a downlink carrier corresponding to a cell which is beyond the TA group to which the secondary cell belongs and has already established uplink synchronization with the base station or a downlink carrier corresponding to a cell preconfigured by the base station, the user equipment can determine an uplink TA used for uplink transmission on the secondary cell as follows:

Firstly the user equipment receives a PDCCH order sent from the base station to trigger the user equipment to perform a random access and then determines from the downlink timing of the timing reference downlink carrier an instant at which a random access preamble is to be sent to the base station and sends the random access preamble to the base station at the instant; here the instant t at which the random access preamble is to be sent to the base station can be determined in the equation of:

t=t0−$N_{TA\ offset}$*TS, where t0 is an instant which downlink data is received in a downlink sub-frame of the timing reference downlink carrier, and $N_{TA\ offset}$ is an offset related to a duplex mechanism, with $N_{TA\ offset}=0$ for FDD and $N_{TA\ offset}=624$ for TDD; and then the uplink data is sent to the base station at the determined instant t; and Then the user equipment receives a random access response carrying a TA sent from the base station and then determines the TA carried in the random access response as an uplink TA used for uplink transmission on the secondary cell.

In a third example, when the timing reference downlink carrier is a downlink carrier corresponding to the primary cell or a downlink carrier corresponding to a cell which is beyond the TA group to which the secondary cell belongs and has already established uplink synchronization with the base station or a downlink carrier corresponding to a cell preconfigured by the base station, the user equipment can determine an uplink TA used for uplink transmission on the secondary cell in the equation of:

Uplink TA=Uplink TA used by the cell corresponding to the timing reference downlink carrier+the difference between Downlink TA used by the secondary cell and Downlink TA used by the cell corresponding to the timing reference downlink carrier.

The invention will be described below in details.

An essential idea of the invention lies in that when a base station newly adds a SCell for a user equipment, a unique timing reference downlink carrier will be determined for obtainment and use of an uplink timing advance of the newly added SCell, particularly as follows:

If there is a cell having already established uplink synchronization in a TA group to which the newly added SCell belongs, then the newly added SCell uses the same timing reference downlink carrier as the cell having already established uplink synchronization in the TA group.

If none of cells in a TA group to which the newly added SCell belongs establishes uplink synchronization, then one of the following downlink carriers can be determined as a timing reference downlink carrier of the newly added SCell:

A downlink carrier corresponding to a PCell;

A downlink carrier corresponding to the newly added SCell; and

A downlink carrier corresponding to a cell currently having already established uplink synchronization, e.g., a carrier over which a PDCCH order is sent; and A downlink carrier of a cell preconfigured by the base station in RRC signaling.

Embodiments of the invention are as follows:

Assumed both the base station and the user equipment support three carriers numbered Cell_1, Cell_2, Cell_3 and Cell_4 where any two of Cell_1, Cell_2 and Cell_3 can not use the same uplink timing advance, but Cell_1 and Cell_4 can use the same uplink timing advance.

First Embodiment

A newly added SCell uses the same timing reference downlink carrier as a cell having already established uplink synchronization in the TA group;

Step 1: The user equipment establishes RRC connection in a PCell;

The user equipment Cell_1 an RRC connection with the base station in a random access procedure, and then Cell_1 can be a PCell. In this random access procedure, a timing reference downlink carrier used by the Msg1 is a downlink carrier of Cell_1.

Step 2: The base station adds an SCell;

With an increasing amount of data of the user equipment, the base station needs to configure the user equipment additionally with a cell, and an SCell can be added in an RRC reconfiguration procedure. Assumed the added cell is numbered Cell_4.

Step 3: An uplink timing advance of the newly added SCell is obtained;

Since Cell_4 and Cell_1 belong to the same TA group, it can be determined that Cell_4 can use the same uplink timing advance and timing reference downlink carrier as Cell_1.

Step 4: Uplink data is transmitted in the added SCell.

The user equipment performs subsequent transmission of uplink data by the uplink timing advance determined in the step 3 based upon downlink timing of the timing reference downlink carrier determined in the step 3.

Second Embodiment

A newly added SCell uses the same timing reference downlink carrier as a cell the last to initiate a random access successfully in the TA group.

Step 1: The user equipment aggregates the cells.

Assumed the user equipment aggregates them into 2 TA groups, one of which is pTAG including a PCell and the other of which is sTAG including Cell_1, and both of these two TA groups have established uplink synchronization.

Step 2: The base station adds an SCell;

With an increasing amount of data of the user equipment, the base station needs to configure the user equipment additionally with a cell, and an SCell can be added in an RRC reconfiguration procedure. Assumed the added cell is numbered Cell_4 belonging to the same TA group as Cell_1.

Step 3: An uplink timing advance of the newly added SCell is obtained;

Since Cell_4 and Cell_1 belong to the same TA group and Cell_1 is a cell the last to initiate a random access successfully in the TA group, it can be determined that Cell_4 can use the same uplink timing advance and timing reference downlink carrier as Cell_1.

Step 4: Uplink data is transmitted in the newly added SCell.

The user equipment performs subsequent transmission of uplink data by the uplink timing advance determined in the step 3 based upon downlink timing of the timing reference downlink carrier determined in the step 3.

Step 5: A random access cell is changed;

If the base station triggers a random access to be initiated in Cell_4 in the TA group and the random access succeeds, then timing reference downlink carriers of all the cells in the TA group are changed to Cell_4, and if a new SCell is added again in the TA group and no new RA takes place in the TA group before the SCell is added, then the timing reference downlink carrier corresponding to Cell_4 can also be used as a timing reference downlink carrier thereof.

Third Embodiment

A newly added SCell uses a downlink carrier of an active cell with lowest or highest number in the TA group as a timing reference downlink carrier of uplink transmission thereof.

Step 1: The user equipment aggregates the cells.

Assumed the user equipment aggregates them into 2 TA groups, one of which is pTAG including a PCell and the other of which is sTAG including Cell_1, and both of these two TA groups have established uplink synchronization.

Step 2: The base station adds an SCell;

With an increasing amount of data of the user equipment, the base station needs to configure the user equipment additionally with a cell, and an SCell can be added in an RRC reconfiguration procedure. Assumed the added cell is numbered Cell_4 belonging to the same TA group as Cell_1.

Step 3: An uplink timing advance of the newly added SCell is obtained;

Since Cell_4 and Cell_1 belong to the same TA group and Cell_1 is a cell with the lowest number in the TA group, it can be determined that Cell_4 can use the same uplink timing advance and timing reference downlink carrier as Cell_1. Of course, if a timing reference downlink carrier of the TA group is selected under a principle of being active and the highest number, then a downlink carrier corresponding to Cell_4 shall be selected.

Step 4: Uplink data is transmitted in the newly added SCell.

The user equipment performs subsequent transmission of uplink data by the uplink timing advance determined in the step 3 based upon downlink timing of the timing reference downlink carrier determined in the step 3.

Fourth Embodiment

A downlink carrier of a PCell is determined as a timing reference downlink carrier;

Step 1: The user equipment establishes an RRC connection in a PCell;

The user equipment establishes in Cell_1 an RRC connection with the base station in a random access procedure, and then Cell_1 can be a PCell. In this random access procedure, a timing reference downlink carrier used by the Msg1 is a downlink carrier of Cell_1.

Step 2: The base station adds an SCell;

With an increasing amount of data of the user equipment, the base station needs to configure the user equipment additionally with a cell, and an SCell can be added in an RRC reconfiguration procedure. Assumed the added cell is numbered Cell_2.

Figure 7A:
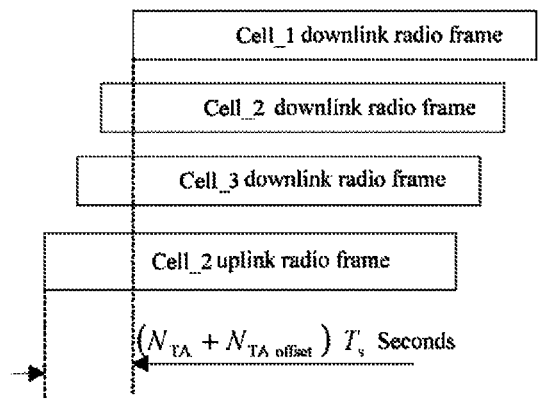
FIG. 7A is a schematic diagram of adjusting a timing advance according to a second embodiment of the invention.

Step 3: An uplink timing advance of the newly added SCell is obtained;

Since there is different uplink timing advances of Cell_2 and Cell_1, the uplink timing advance in Cell_2 will be obtained. One method of obtaining the uplink timing advance in Cell_2 is to perform a random access in Cell_2. The base station can send a PDCCH order in Cell_1 to trigger the user equipment to perform a random access in Cell_2, and at this time a timing reference downlink carrier used by the Msg1 in uplink transmission will be determined, and a downlink carrier of Cell_1 (i.e., the PCell) can be used as a timing reference downlink carrier as illustrated in FIG. 7A.

After the user equipment sends the Msg1 in Cell_2, the base station receives a preamble, and the base station determines the uplink timing advance in Cell_2 as the difference between its expected reception instant and actual reception instant.

Step 4: The user equipment is notified of the uplink timing advance in the newly added SCell;

The base station sends the uplink timing advance in Cell_2 obtained in the step 3 to the user equipment in the Msg2, and assumed the user equipment receives the uplink timing advance in a sub-frame n, then the user equipment revises an uplink timing advance used by the Msg1 by the timing advance in a sub-frame n+k and performs uplink transmission by the modified timing advance based upon DL timing of the PCell. Typically k is 6.

Step 5: All of carriers in a TA group to which a subsequently newly added SCell belongs use a downlink carrier of the PCell as a timing reference downlink carrier.

Fifth Embodiment

A downlink carrier corresponding to a newly added SCell is determined as a timing reference downlink carrier;

Step 1: An RRC connection is established in a PCell;

The user equipment establishes in Cell_1 an RRC connection with the base station in a random access procedure, and then Cell_1 can be a PCell. In this random access procedure, a timing reference downlink carrier used by the Msg1 is a downlink carrier of Cell_1.

Step 2: The base station adds an SCell;

With an increasing amount of data of the user equipment, the base station needs to configure the user equipment additionally with a cell, and an SCell can be added in an RRC reconfiguration procedure. Assumed the added cell is numbered Cell_2.

Figure 7B:
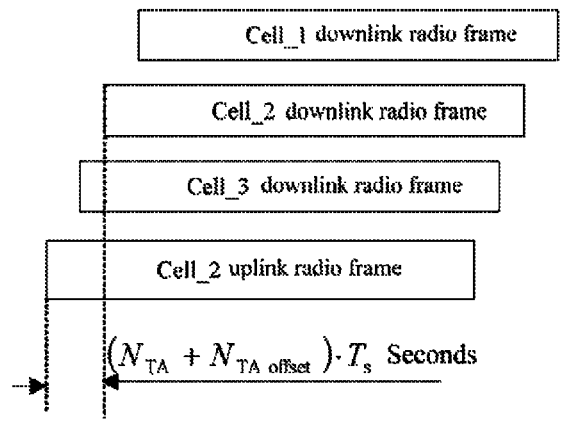
FIG. 7B is a schematic diagram of adjusting a timing advance according to a third embodiment of the invention.

Step 3: An uplink timing advance of the newly added SCell is obtained;

Since there are different uplink timing advances of Cell_2 and Cell_1, the uplink timing advance in Cell_2 will be obtained. One method of obtaining the uplink timing advance in Cell_2 is to perform a random access in Cell_2. The base station can send a PDCCH order in any cell having already established uplink synchronization (including the PCell and an S-Cell) to trigger the user equipment to perform a random access in Cell_2, and at this time a timing reference downlink carrier used by the Msg1 in uplink transmission will be determined, and a simply method is to use a downlink carrier of the current cell as a timing reference downlink carrier as illustrated in FIG. 7B.

After the user equipment sends the Msg1 the base station receives a preamble, and the base station determines the uplink timing advance in Cell_2 as the difference between its expected reception instant and actual reception instant.

Step 4: The user equipment is notified of the uplink timing advance in the new added SCell;

The base station sends the uplink timing advance in Cell_2 obtained in the step 3 to the user equipment in the Msg2, and assumed the user equipment receives the uplink timing advance in a sub-frame n, then the user equipment revises an uplink timing advance used by the Msg1 by the timing advance in a sub-frame n+k and performs uplink transmission by the modified timing advance based upon DL timing of the current cell. Typically k is 6.

Step 5: All of carriers in a TA group to which a subsequently newly added SCell belongs use a downlink carrier of Cell_2 as a timing reference downlink carrier.

Sixth Embodiment

A DL carrier of a cell having already established uplink synchronization (which may be a PCell or an Scell), e.g., a downlink carrier over which the base station sends a PDCCH order to trigger the user equipment to perform a random access, is determined as a tinting reference downlink carrier;

Step 1: An RRC connection is established in a PCell;

The user equipment establishes in Cell_1 an RRC connection with the base station in a random access procedure, and then Cell_1 can be a PCell. In this random access procedure, a timing reference downlink carrier used by the Msg1 is a downlink carrier of Cell_1.

Step 2: The base station adds an SCell;

With an increasing amount of data of the user equipment, the base station needs to configure the user equipment additionally with a cell, and an SCell can be added in an RRC reconfiguration procedure. Assumed the added cell is numbered Cell_3 and the base station establishes uplink synchronization in Cell_3. For a particular method thereof, reference can be made to the first and second embodiments.

Figure 7C:
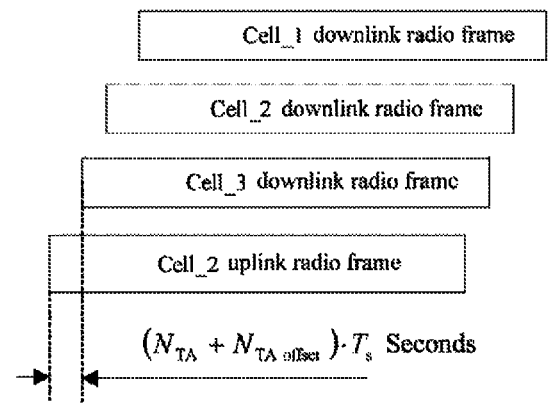
FIG. 7C is a schematic diagram of adjusting a timing advance according to a fourth embodiment of the invention.

Step 3: The base station further adds an Scell;

With a further increasing amount of data, Cell_2 needs to be further added. At this time the cells which have established uplink synchronization are Cell_1 (PCell) and Cell_3. The base station can send a PDCCH order in any cell having already established uplink synchronization to trigger the user equipment to perform a random access in Cell_2, and over whichever cell the PDCCH order is sent, the cell can be used as a timing reference downlink carrier in Cell_2. Assumed the base station sends the PDCCH order in Cell_3 to trigger a random access of Cell_2, then a downlink carrier of Cell_3 can be used as a timing reference downlink carrier of Cell_2 as illustrated in FIG. 7C.

After the user equipment sends the Msg1 in Cell_2, the base station receives a preamble, and the base station determines an uplink timing advance in Cell_2 as the difference between its expected reception instant and actual reception instant.

Step 4: The user equipment is notified of the uplink timing advance in the newly added SCell;

The base station sends the uplink timing advance in Cell_2 obtained in the step 3 to the user equipment in the Msg2, and assumed the user equipment receives the uplink timing advance in a sub-frame n, then the user equipment revises an uplink timing advance used by the Msg1 by the timing advance in a sub-frame n+k and performs uplink transmission by the modified timing advance with reference to downlink timing of Cell_3. Typically k is 6.

Step 5: All of carriers in a TA group to which a subsequently newly added SCell belongs use the downlink carrier of Cell_3 as a timing reference downlink carrier.

Seventh Embodiment

A DL carrier of a cell having already established uplink synchronization is determined as a timing reference downlink carrier, and the cell may be a PCell or a Scell, and the following description will be given taking a PCell as an example. This method is only applicable to a TDD system.

Step 1: An RRC connection is established in a PCell;

The user equipment establishes in Cell_1 an RRC connection with the base station in a random access procedure, and then Cell_1 can be a PCell. In this random access procedure, a timing reference downlink carrier used by the Msg1 is a downlink carrier of Cell_1.

Step 2: The base station adds an SCell;

With an increasing amount of data of the user equipment, the base station needs to configure the user equipment additionally with a cell, and an SCell can be added in an RRC reconfiguration procedure. Assumed the added cell is numbered Cell_2.

Step 3: An uplink timing advance of the newly added SCell is obtained;

Since there are different uplink timing advances of Cell_2 and Cell_1, the uplink timing advance in Cell_2 will be obtained.

Since the same carrier is used in the uplink and the downlink in a TDD system, Cell_2 can use a downlink carrier of a cell having already established uplink synchronization (here the cell having already established uplink synchronization is the PCell) as a timing reference downlink carrier and can determine the uplink timing advance in Cell_2 as the sum of the difference in timing advance between downlink carriers of the reference cell and Cell_2 and the uplink timing advance in the reference cell.

That is, Uplink timing advance in Cell_2=Uplink timing advance in Cell_1+the difference in downlink timing between Cell_2 and Cell_1.

Step 4: The user equipment transmits data in the newly added SCell;

The user equipment transmits uplink data by the uplink timing advance obtained in the step 3 based upon the starting point of a radio frame of the PCell having already established uplink synchronization in newly added Cell_2 using the PCell as a timing reference downlink carrier.

Step 5: All of carriers in a TA group to which a subsequently newly added SCell belongs use the downlink carrier of the PCell as a timing reference downlink carrier.

Eighth Embodiment

A downlink carrier configured in RRC signaling is determined as a timing reference downlink carrier;

Step 1: An RRC connection is established in a PCell;

The user equipment establishes in Cell_1 an RRC connection with the base station in a random access procedure, and then Cell_1 can be a PCell. In this random access procedure, a timing reference downlink carrier used by the Msg1 is a downlink carrier of Cell_1.

Step 2: The base station adds an SCell;

With an increasing amount of data of the user equipment, the base station needs to configure the user equipment additionally with a cell, and an SCell can be added in an RRC reconfiguration procedure. Assumed the added cell is numbered Cell_2. Also the base station configures a timing reference downlink carrier of the cell in RRC signaling as a downlink carrier corresponding to Cell_1.

Figure 7D:
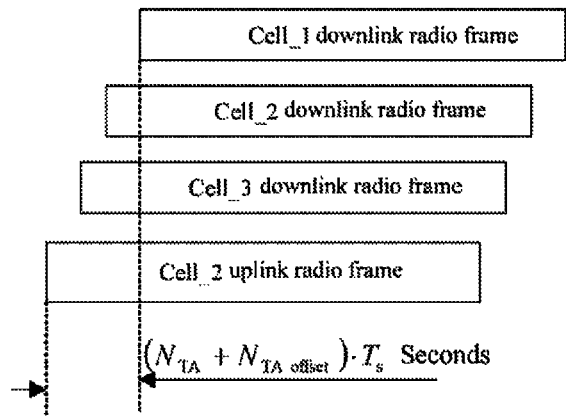
FIG. 7D is a schematic diagram of adjusting a timing advance according to a sixth embodiment of the invention.

Step 3: An uplink timing advance of the newly added SCell is obtained;

One method of obtaining an uplink timing advance in Cell_2 is to perform a random access in Cell_2. The base station can send a PDCCH order in any available DL carrier to trigger the user equipment to perform a random access in Cell_2, and at this time a timing reference downlink carrier used by the Msg1 in uplink transmission will be determined, and the user equipment can use the downlink carrier of Cell_1 as a timing reference downlink carrier as configured by the base station in the RRC signaling as illustrated in FIG. 7D.

After the user equipment sends the Msg1 in Cell_2, the base station receives a preamble, and the base station determines the uplink timing advance in Cell_2 as the difference between its expected reception instant and actual reception instant.

Step 4: The user equipment is notified of the uplink timing advance in the newly added SCell;

The base station sends the uplink timing advance in Cell_2 obtained in the step 3 to the user equipment in the Msg2, and assumed the user equipment receives the uplink timing advance in a sub-frame n, then the user equipment revises an uplink timing advance used by the Msg1 by the timing advance in a sub-frame n+k and performs uplink transmission by the modified timing advance based upon DL timing of Cell_1 configured by the base station. Typically k is 6.

Step 5: All of carriers in a TA group to which a subsequently newly added SCell belongs use a downlink carrier in Cell_1 configured in the RRC signaling as a timing reference downlink carrier.

Figure 8:
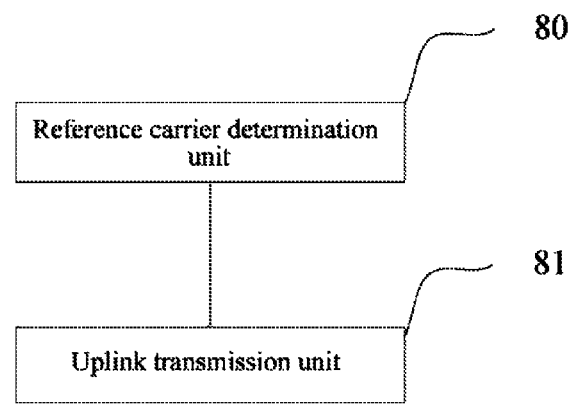
FIG. 8 is a schematic structural diagram of an apparatus according to an embodiment of the invention

Referring to FIG. 8, an embodiment of the invention further provides a user equipment including:

A reference carrier determination unit 80 configured to select one of downlink carriers corresponding to cells having already established downlink synchronization with a base station under a preset reference carrier selection rule as a timing downlink carrier used by a secondary cell after the base station configures the user equipment additionally with the secondary cell; and An uplink transmission unit 81 configured to perform uplink transmission in the secondary cell according to downlink timing of the timing reference downlink carrier.

The reference carrier determination unit 80 is configured:

To select a timing reference downlink carrier used by a cell which is in a TA group to which the secondary cell belongs and has already established uplink synchronization with the base station as a timing reference downlink carrier used by the secondary cell;

To select a downlink component carrier corresponding to a cell the last to initiate random access successfully in a TA group to which the secondary cell belongs as a timing reference downlink carrier used by the secondary cell;

To select a downlink component carrier corresponding to an active cell with the lowest number in a TA group to which the secondary cell belongs as a timing reference downlink carrier used by the secondary cell;

To select a downlink carrier corresponding to a primary cell as a timing reference downlink carrier used by the secondary cell;

To select a downlink carrier corresponding to the secondary cell as a timing reference downlink carrier used by the secondary cell;

To select a downlink carrier corresponding to a cell which is beyond a TA group to which the secondary cell belongs and has already established uplink synchronization with the base station as a timing reference downlink carrier used by the secondary cell; and To select a downlink carrier corresponding to a cell preconfigured by the base station as a timing reference downlink carrier used by the secondary cell.

The uplink transmission unit 81 is configured:

To determine an uplink TA used for uplink transmission on the secondary cell; and To perform uplink transmission in the secondary cell by the determined uplink TA based upon the downlink timing of the timing reference downlink carrier.

The uplink transmission unit 81 is configured:

When the timing reference downlink carrier is a timing reference downlink carrier used by a cell which is in the TA group to which the secondary cell belongs and has established uplink synchronization with the base station or a downlink component carrier, selected by the user equipment, corresponding to a cell the last to initiate a random access successfully in the TA group to which the secondary cell belongs, to determine an uplink TA used by the cell having already established uplink synchronization with the base station as an uplink TA used for uplink transmission on the secondary cell.

The uplink transmission unit 81 is configured:

When the timing reference downlink carrier is a downlink carrier corresponding to a primary cell or a downlink carrier corresponding to the secondary cell or a downlink carrier corresponding to a cell which is beyond the TA group to which the secondary cell belongs and has already established uplink synchronization with the base station or a downlink carrier corresponding to a cell preconfigured by the base station, to receive a PDCCH order sent from the base station to trigger the user equipment to perform a random access and then determine from the downlink timing of the timing reference downlink carrier an instant at which a random access preamble is sent to the base station and to send the random access preamble to the base station at the instant; and To receive a random access response carrying a TA sent from the base station and then determine the TA as an uplink TA used for uplink transmission on the secondary cell.

The uplink transmission unit 81 is configured:

When the timing reference downlink carrier is a downlink carrier corresponding to a primary cell or a downlink carrier corresponding to a cell which is beyond the TA group to which the secondary cell belongs and has already established uplink synchronization with the base station or a downlink carrier corresponding to a cell preconfigured by the base station, to determine an uplink TA used for uplink transmission on the secondary cell in the equation of:

Uplink TA=Uplink TA used by the cell corresponding to the timing reference downlink carrier+the difference between Downlink TA used by the secondary cell and Downlink TA used by the cell corresponding to the timing reference downlink carrier.

The downlink carrier corresponding to a cell which is beyond the TA group to which the secondary cell belongs and has already established uplink synchronization with the base station is a downlink carrier over which the base station sends a PDCCH order to trigger the user equipment to perform a random access.

In summary, the invention has the following advantageous effects:

In the solution according to the embodiments of the invention, a user equipment selects one of downlink carriers corresponding to cells having already established downlink synchronization with a base station under a preset reference carrier selection rule as a timing reference downlink carrier used by a secondary cell after the base station configures the user equipment additionally with the secondary cell and performs uplink transmission in the secondary cell according to downlink timing of the timing reference downlink carrier. As can be apparent, the invention can address the issue of how to determine a timing reference downlink carrier used by a secondary cell in uplink transmission when a base station configures a user equipment additionally with the secondary cell in a carrier aggregation system and can further perform uplink transmission over the determined timing reference downlink carrier.

Those skilled in the art shall appreciate that the embodiments of the invention can be embodied as a method, a system or a computer program product. Therefore the invention can be embodied in the form of an all-hardware embodiment, an all software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An uplink transmission method in a carrier aggregation system, comprising:
   a user equipment selecting, under a preset reference carrier selection rule, one of downlink carriers corresponding to cells having already established downlink synchronization with a base station as a timing reference downlink carrier used by a secondary cell, after the base station configures the user equipment additionally with the secondary cell; and the user equipment performing uplink transmission in the secondary cell according to downlink timing of the timing reference downlink carriers;

wherein, the selecting, under a preset reference carrier selection rule, one of downlink carriers corresponding to cells having already established downlink synchronization with a base station as a timing reference downlink carrier used by a secondary cell comprises:

a user equipment selecting a timing reference downlink carrier used by a cell which is in a Timing Advance (TA) group to which the secondary cell belongs and has already established uplink synchronization with the base station as a timing reference downlink carrier used by the secondary cell; or the user equipment selecting a downlink component carrier corresponding to a cell the last to initiate a random access successfully in a TA group to which the secondary cell belongs as a timing reference downlink carrier used by the secondary cell; or the user equipment selecting a downlink component carrier corresponding to an active cell with the lowest number in a TA group to which the secondary cell belongs as a timing reference downlink carrier used by the secondary cell; or the user equipment selecting a downlink carrier corresponding to a primary cell as a timing reference downlink carrier used by the secondary cell; or the user equipment selecting a downlink carrier corresponding to the secondary cell as a timing reference downlink carrier used by the secondary cell; or the user equipment selecting a downlink carrier corresponding to a cell which is beyond a TA group to which the secondary cell belongs and has already established uplink synchronization with the base station as a timing reference downlink carrier used by the secondary cell; or the user equipment selecting a downlink carrier corresponding to a cell preconfigured by the base station as a timing reference downlink carrier used by the secondary cell.

2. The method according to claim 1, wherein the user equipment performing uplink transmission in the secondary cell according to downlink timing of the timing reference downlink carrier comprises:

the user equipment determining an uplink TA used for uplink transmission on the secondary cell; and the user equipment performing uplink transmission in the secondary cell by the determined uplink TA based upon the downlink timing of the timing reference downlink carrier.

3. The method according to claim 2, wherein when the timing reference downlink carrier is a timing reference downlink carrier used by a cell which is in the TA group to which the secondary cell belongs and has established uplink synchronization with the base station or a downlink component carrier, selected by the user equipment, corresponding to a cell the last to initiate a random access successfully in the TA group to which the secondary cell belongs, the user equipment determining an uplink TA used for uplink transmission on the secondary cell comprises:

the user equipment determining an uplink TA used by the cell having already established uplink synchronization with the base station as an uplink TA used for uplink transmission on the secondary cell.

4. The method according to claim 2, wherein when the timing reference downlink carrier is a downlink carrier corresponding to a primary cell or a downlink carrier corresponding to the secondary cell or a downlink carrier corresponding to a cell which is beyond the TA group to which the secondary cell belongs and has already established uplink synchronization with the base station or a downlink carrier corresponding to a cell preconfigured by the base station, the user equipment determining an uplink TA used for uplink transmission on the secondary cell comprises:

the user equipment receiving a Physical Downlink Control Channel (PDCCH) order sent from the base station to trigger the user equipment to perform a random access and then determining from the downlink timing of the timing reference downlink carrier an instant at which a random access preamble is to be sent to the base station and sending the random access preamble to the base station at the instant; and the user equipment receiving a random access response carrying a TA sent from the base station and then determining the TA as an uplink TA used for uplink transmission on the secondary cell.

5. The method according to claim 2, wherein when the timing reference downlink carrier is a downlink carrier corresponding to a primary cell or a downlink carrier corresponding to a cell which is beyond the TA group to which the secondary cell belongs and has already established uplink synchronization with the base station or a downlink carrier corresponding to a cell preconfigured by the base station, an uplink TA used for uplink transmission on the secondary cell is determined in the equation of:

Uplink TA=Uplink TA used by the cell corresponding to the timing reference downlink carrier+the difference between downlink timing used by the secondary cell and downlink timing used by the cell corresponding to the timing reference downlink carrier.

6. The method according to claim 1, wherein the downlink carrier corresponding to a cell which is beyond the TA group to which the secondary cell belongs and has already established uplink synchronization with the base station is a downlink carrier over which the base station sends a PDCCH order to trigger the user equipment to perform a random access.

7. A user equipment, comprising:

a reference carrier determination unit configured to select, under a preset reference carrier selection rule, one of downlink carriers corresponding to cells having already established downlink synchronization with a base station as a timing reference downlink carrier used by a secondary cell, after the base station configures the user equipment additionally with the secondary cell; and an uplink transmission unit configured to perform uplink transmission in the secondary cell according to downlink timing of the timing reference downlink carrier;

wherein the reference carrier determination unit is configured:

to select a timing reference downlink carrier used by a cell which is in a Timing Advance (TA) group to which the secondary cell belongs and has already established uplink synchronization with the base station as a timing reference downlink carrier used by the secondary cell; or to select a downlink component carrier corresponding to a cell the last to initiate a random access successfully in a TA group to which the secondary cell belongs as a timing reference downlink carrier used by the secondary cell; or to select a downlink component carrier corresponding to an active cell with the lowest number in a TA group to which the secondary cell belongs as a timing reference downlink carrier used by the secondary cell; or to select a downlink carrier corresponding to a primary cell as a timing reference downlink carrier used by the secondary cell; or to select a downlink carrier corresponding to the secondary cell as a timing reference downlink carrier used by the secondary cell; or to select a downlink carrier corresponding to a cell which is beyond a TA group to which the secondary cell belongs and has already established uplink synchronization with the base station as a timing reference downlink carrier used by the secondary cell; or to select a downlink carrier corresponding to a cell preconfigured by the base station as a timing reference downlink carrier used by the secondary cell.

8. The user equipment according to claim 7, wherein the uplink transmission unit is configured:
to determine an uplink TA used for uplink transmission on the secondary cell; and
to perform uplink transmission in the secondary cell by the determined uplink TA based upon the downlink timing of the timing reference downlink carrier.

9. The user equipment according to claim 8, wherein the uplink transmission unit is configured:
when the timing reference downlink carrier is a timing reference downlink carrier used by a cell which is in the TA group to which the secondary cell belongs and has established uplink synchronization with the base station or a downlink component carrier, selected by the user equipment, corresponding to a cell the last to initiate a random access successfully in the TA group to which the secondary cell belongs, to determine an uplink TA used by the cell having already established uplink synchronization with the base station as an uplink TA used for uplink transmission on the secondary cell.

10. The user equipment according to claim 8, wherein the uplink transmission unit is configured:
when the timing reference downlink carrier is a downlink carrier corresponding to a primary cell or a downlink carrier corresponding to the secondary cell or a downlink carrier corresponding to a cell which is beyond the TA group to which the secondary cell belongs and has already established uplink synchronization with the base station or a downlink carrier corresponding to a cell preconfigured by the base station, to receive a Physical Downlink Control Channel (PDCCH) order sent from the base station to trigger the user equipment to perform a random access and then determine from the downlink timing of the timing reference downlink carrier an instant at which a random access preamble is to be sent to the base station and to send the random access preamble to the base station at the instant; and
to receive a random access response carrying a TA sent from the base station and then determine the TA as an uplink TA used for uplink transmission on the secondary cell.

11. The user equipment according to claim 8, wherein the uplink transmission unit is configured:
when the timing reference downlink carrier is a downlink carrier corresponding to a primary cell or a downlink carrier corresponding to a cell which is beyond the TA group to which the secondary cell belongs and has already established uplink synchronization with the base station or a downlink carrier corresponding to a cell preconfigured by the base station, to determine an uplink TA used for uplink transmission on the secondary cell in the equation of:
Uplink TA=Uplink TA used by the cell corresponding to the timing reference downlink carrier+the difference between downlink timing used by the secondary cell and downlink timing used by the cell corresponding to the timing reference downlink carrier.

12. The method according to claim 7, wherein the downlink carrier corresponding to a cell which is beyond the TA group to which the secondary cell belongs and has already established uplink synchronization with the base station is a downlink carrier over which the base station sends a PDCCH order to trigger the user equipment to perform a random access.

* * * * *